United States Patent [19]

Kreutz et al.

[11] Patent Number: 4,574,485
[45] Date of Patent: Mar. 11, 1986

[54] BORE-INSERTABLE APPARATUS FOR STATIONARY MEASUREMENT OF BORE-WIDTH CHANGES IN GEOLOGICAL FORMATIONS

[75] Inventors: Ferdinand Kreutz; Jürgen Keck, both of Jülich; Johann Bölingen, Aachen, all of Fed. Rep. of Germany

[73] Assignee: Kernforschungsanlage Jülich Gesellschaft mit beschränkter Haftung, Jülich, Fed. Rep. of Germany

[21] Appl. No.: 691,458

[22] Filed: Jan. 14, 1985

[30] Foreign Application Priority Data

Jan. 12, 1984 [DE] Fed. Rep. of Germany ....... 3400833

[51] Int. Cl.⁴ ............................................. G01B 7/02
[52] U.S. Cl. ................ 33/143 L; 33/147 K; 73/784
[58] Field of Search ............... 33/1 H, 125 B, 143 L, 33/147 D, 147 K, 147 N, 178 E, DIG. 2; 73/784

[56] References Cited

U.S. PATENT DOCUMENTS

| | | | |
|---|---|---|---|
| 1,708,333 | 4/1929 | Smith | 33/147 D |
| 4,094,189 | 6/1978 | Serata | 33/1 H |
| 4,369,653 | 1/1983 | Ciosek, Jr. | 33/147 N |
| 4,457,072 | 7/1984 | Andersen | 33/143 L |
| 4,461,171 | 7/1984 | de la Cruz | 73/784 |

Primary Examiner—Richard R. Stearns
Attorney, Agent, or Firm—Frishauf, Holtz, Goodman & Woodward

[57] ABSTRACT

A measuring device for long-term installation in a bore in a rock formation for detecting gradual changes in bore diameter, especially gradual constriction which might affect the condition of radioactive waste deposited in the bore, utilizes telescoping parts under outward spring pressure. One of the two elements of the transducer which by the relative displacement of these elements measures changes in diameter, is a rod held in a friction mounting on one of the telescoping parts that maintains the position of the device in the bore. The other element of the transducer is fixed on the other telescoping part which also carries limit stops (7,8) which in corporation with a stop (6) on the rod confines the lengthwise movement of the rod to a stroke equal to the maximum measuring range of the transducer. For measuring gradual constriction, the transducer is automatically set to begin with the maximum measureable diameter. Remote control setting of the initial position of the rod is necessary if both enlargement and constriction with time are to be measured.

3 Claims, 1 Drawing Figure

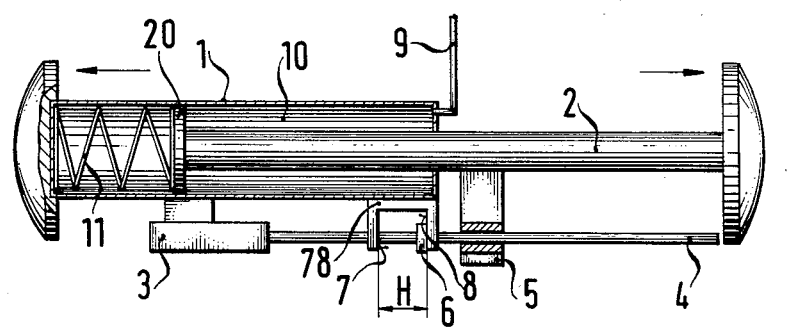

BORE-INSERTABLE APPARATUS FOR STATIONARY MEASUREMENT OF BORE-WIDTH CHANGES IN GEOLOGICAL FORMATIONS

The invention concerns apparatus for determining the change of diameter of bores in rock formations, especially those in which disposable bodies or test samples of radioactive waste have been deposited. The measuring apparatus is of the kind having two parts respectively applicable to opposite walls of the bore which are radially displaceable in opposite directions with respect to each other under elastic force and also having an inductive or capacitive electrical displacement transducer for measuring the radial displacement.

It has been found that bores in geological formations undergo changes in diameter in the course of time. In particular, it is important to determine gradual constriction in large-caliber bores in rock salt mines and the like. The knowledge of the magnitude of this diminution of the diameter with time is particularly important when disposable masses or test samples, for example of radioactive waste, have been deposited in deep bores.

A measuring device of the kind above described is known from a mining periodical, Bergbau, No. 9 of 1981, pp. 378 to 583. This known device has two parts respectively applicable to opposite walls of the bore, elastically movable with respect to each other and radially closeable, as well as an inductive displacement-sensing transducer.

SUMMARY OF THE INVENTION

It is an object of this invention to improve devices of the kind just described, so that measurements of very small changes in diameter can be made, while nevertheless the entire stroke of the length or displacement measuring transducer can be used in order to obtain high sensitivity.

Briefly, the two parts respectively applicable to the opposite sides of the bore are constituted as elongated parts which can be slid one inside the other, and the displacement sensor is constituted of a body rigidly connected to one of the two relatively sliding parts, and a longitudinally displaceable rod held by a friction coupling in the other of the two slideable parts.

Installations of the apparatus in accordance with the invention, involves placing it in the bore in line with a diameter to be measured where it remains diametrically clamped in the hole at the chosen location for the measurement. The friction coupling makes it possible for the transducer to remain within the range of its usable stroke after the installation in the bore, even when the device was more drastically shortened in the installation stage, beyond the limits of the stroke of the sensor transducer. The practice of the invention thus makes it possible to utilize a very sensitive transducer with a short stroke, so that even changes of diameter by less than 0.1 mm can be measured.

A particularly useful embodiment of the measuring apparatus of the invention is provided when the permissible play of the displaceable rod of the sensor transducer, relative to the clamping part on which the fixed element of the transducer is mounted, is limited to movement between two end positions by means of a stop affixed to the rod, the distance between the end positions corresponding to the maximum displacement measurement range of the transducer. If the end position of the stop more remote from the fixed body of the transducer corresponds to the outward limit of the stroke of the end of the rod away from the fixed body of the transducer, the result is obtained that after fitting the apparatus into the bore, the transducer will be located at the beginning of its stroke, so that the entire measuring range is available for determination of the diminution of the diameter.

It can also be useful, for example for shifting of the measurement range of the transducer, to provide an electrical drive for shifting the displaceable rod in its friction coupling by means of a threaded spindle so that the initial setting of the rod may be at some other point of the measurement range.

BRIEF DESCRIPTION OF THE DRAWING

The invention is further described by way of illustrative example with reference to the annexed drawing, the single FIGURE of which is a schematic representation in side view, partly in section, of a measuring device according to the invention.

DESCRIPTION OF THE ILLUSTRATED EMBODIMENT

A measuring device designed to be oriented across the bore for measuring diameter consists of two longitudinal parts 1 and 2, in this case constituted essentially of tubes of different diameter, the tube 2 being arranged to slide within the tube 1. A displacement sensor is provided by the body 3 fixed on the tubular part 1 together with the push rod 4 held in a friction hub in the body 5 that is affixed to the tubular part 2. A stop 6 on the rod 4 limits the lengthwise displacement of the rod 4 to the distance H between the arms 7 and 8 of a U-shaped body 78 affixed to the tubular part 1. The end positions of the stop 6 may be referred to as 7 and 8.

The measuring device is shortened before it is lowered into a bore hole by admitting compressed air through the hose connection 9 into the chamber 10 of the longitudinal part 1, acting on the piston 20 on the end of the part 2, which then compresses the spring 11. When the measuring device has been lowered (by means not shown) to the place of measurement, compressed air is released through the hose 9, allowing the measuring device automatically to lengthen and to clamp itself at the place of measurement.

The relative displacement of the two parts 1 and 2 with respect to each other, from the shortened configuration used for lowering the device to the extended configuration for clamping it at the place of measurement, is as a rule greater than the maximum stroke of the displacement sensor 3,4. When the apparatus is shortened, the stop 6 is in its end position 7 and when it is lengthened, it gets into its end position 8. With any further displacement of the tubular parts 1 and 2 with respect to each other, the rod 4 slides in its friction coupling. The position of the stop 6 shown in the drawing accordingly is its position after extension of the measuring device for its clamping in the place of measurement.

For the case in which only a diminution of the diameter of the bore is to be expected, it is advantageous that the path length H between the end positions 7 and 8 should correspond to the maximum stroke of the displacement sensor. In particular, the end position 8 should correspond to the limit of the stroke of the end of the rod 4 which is distant from the sensor body 3. In that way the full stroke of the sensor is available for measurement when it is a matter of measuring gradual constriction of the bore in the course of time. In a case in which either an enlargement or a reduction of the bore diameter could occur and would accordingly have to be measured, it is advantageous to use a threaded spindle that is remotely controlled electrically, for shifting the push rod 4 so that it can measure a diameter change in either sense within the limited range of the sensor body 3. In such a case, after the installation of the device in the bore, the sensor can be adjusted by moving the push rod 4 out of the position shown in the drawing towards the sensor body 3, so that the stop 6 comes to lie substantially in the middle of the path H.

Although the invention has been described with reference to a specific embodiment, it will be understood that variations and modifications are possible within the inventive concept.

We claim:

1. Apparatus for stationary measurement of changes of diameter in a rock bore into which said apparatus is insertable comprising two parts respectively applicable to opposite sides of said bore, capable of relative displacement with respect to each other, elastic means for urging said parts respectively against said opposite sides of said bore, and electrical displacement sensing means including portions thereof respectively connected to said two parts, and further comprising:

portions of said two relatively displaceable parts (1,2) so shaped and disposed that relative displacement of said parts takes place by movement of a portion of one of them into or out of a portion of the other;

a portion of said electrical displacement sensing means constituted as a rod (4) aligned parallel to the direction of said relative displacement of said two apparatus parts and held for movement in another portion (3) of said electrical displacement sensing means which is affixed to a first one (1) of said two apparatus parts, friction coupling means (5) being fixed on the second (2) of said apparatus parts for holding said rod (4) and permitting lengthwise movement thereof only after the friction of said coupling is overcome, and means for limiting the extent of lengthwise displacement of said rod (4) relative to said portion of said electrical sensing means which is affixed to said first apparatus part.

2. Apparatus according to claim 1, in which said means for limiting the extent of lengthwise displacement of said rod (4) comprise a first stop (6) affixed to said rod and second and third stops (7,8) affixed to said first apparatus part to which said portion, other than said rod, of said electrical sensing means is affixed.

3. Apparatus according to claim 1, in which remotely controlled means are provided for setting the position of said rod (4) within its said limited range of displacement relative to said portion (3) of said electrical sensing means affixed to said first apparatus part, said remotely controlled setting means being disengageable from said rod by remote control.

* * * * *